United States Patent [19]
Henderson et al.

[11] Patent Number: 6,160,734
[45] Date of Patent: Dec. 12, 2000

[54] METHOD FOR ENSURING SECURITY OF PROGRAM DATA IN ONE-TIME PROGRAMMABLE MEMORY

[75] Inventors: Alva Henderson, Sherman; Francesco Cavaliere, Plano, both of Tex.

[73] Assignee: Texas Instruments Incorporated, Dallas, Tex.

[21] Appl. No.: 09/322,800

[22] Filed: May 28, 1999

Related U.S. Application Data

[60] Provisional application No. 60/087,957, Jun. 4, 1998, provisional application No. 60/089,572, Jun. 17, 1998, and provisional application No. 60/090,668, Jun. 25, 1998.

[51] Int. Cl.[7] ................................................... G11C 16/04
[52] U.S. Cl. ......................................................... 365/185.04
[58] Field of Search ..................... 365/185.04; 379/413; 711/9, 100; 380/4

[56] References Cited

U.S. PATENT DOCUMENTS

| | | | |
|---|---|---|---|
| 4,975,878 | 12/1990 | Boddu et al. ...................... | 365/185.04 |
| 5,161,184 | 11/1992 | Smith et al. ............................. | 379/413 |
| 5,522,086 | 5/1996 | Burton et al. ............................... | 710/9 |
| 5,774,545 | 6/1998 | Raghavachari ............................. | 380/4 |
| 5,901,328 | 5/1999 | Ooe ........................................ | 711/100 |

*Primary Examiner*—Trong Phan
*Attorney, Agent, or Firm*—Mark E. Courtney; Wade James Brady; Frederick J. Telecky

[57] ABSTRACT

This application describes a method of protecting data and program code stored in an EPROM array from piracy. The security scheme allows for segmentation of the array to protect one section of the array from reading while programming a non-secure section. The security scheme also allows for protection of the entire array after programming is complete. It also incorporates a device to prevent tampering with the segmentation registers and a means to prevent circumvention of the security scheme even when the processor is in one or more of its test modes.

14 Claims, 5 Drawing Sheets

METHOD FOR ENSURING SECURITY OF PROGRAM DATA IN ONE-TIME PROGRAMMABLE MEMORY

This application claims priority under 35 USC § 119 (e) (1) of Provisional Special Application Ser. No. 60/087,957, filed Jun. 4, 1998; Provisional Special Application Ser. No. 60/089,572, filed Jun. 17, 1998; and Provisional Application Ser. No. 60/090,668, filed Jun. 25, 1998.

BACKGROUND AND SUMMARY OF THE INVENTION

This invention relates to computer microprocessors, and more specifically to microprocessors that feature internal one-time programmable (OTP) memory.

Background: Permanent Operating Code in Computers and Microcontrollers

A computer or microcontroller typically has a significant portion of its operating code stored in non-volatile memory (e.g., ROM, EPROM, flash memory) so that the code is retained even when the power is off. Often, some or all of this code will be stored in memory residing on the same chip as the central processing unit (CPU) itself (internal memory), thus allowing the CPU and its basic operating code to be packaged as a single unit. This integration of functions within a single chip serves to simplify the design of assemblies using the processor. This integration also serves to reduce part count and improve reliability.

Background: Permanent Operating Code stored in OTP Memory

Many microprocessors, particularly the class of microprocessors known as microcontrollers, store their internal operating code in some form of electrically-programmable read-only memory (EPROM) such as UV-erasable EPROM, EEPROM, one-time programmable (OTP) memory, or flash memory. This design allows the operating code to be programmed after the ICs are manufactured, affording a much higher degree of flexibility than ROM-based designs. With this architecture, a manufacturer can revise and improve the operating code after manufacture or custom tailor the operating code to meet the particular needs of multiple customers. Alternatively, he can leave the EPROM banks empty or partially programmed so that the customer can install his own code. This design allows for the manufacture of a higher volume of chips with each setup, reduces the need for specialized inventory on-hand, and facilitates rapid prototyping.

Background: Security of On-chip Software

In many cases, a chip programmer (either the manufacturer or another party) will program a chip with software code lie would prefer to keep secret. In such a case, the earlier programmer will wish to constrain subsequent programmers and users of the chip from reading and copying the memory banks of the chip, while still allowing access for execution of the code stored therein. A manufacturer may wish to program one portion of the chip's internal memory while leaving the rest of the internal memory open for a customer to program. In such a case, one or both of the programmers may wish to protect the code from the other programmers and from third parties.

Background: Secure Memory

Protection of memory against unauthorized copying is a complex and difficult task. The protected memory will generally contain code and code-related data that must be readable by the processor in order to be of any use. More problematic, control of the CPU must be ceded to later programmers and users, many of whom will have interests hostile to those of the earlier programmers. Any protection scheme must anticipate possible avenues of circumvention ahead of time so as to close those avenues off in the design.

Current memory security schemes lock the internal memory banks as a unit. Where an initial programmer wished to program one portion of the memory while leaving the remainder for a customer, the read-protect had to be left disabled, leaving the first programmer's software unprotected. For those familiar with the device, there was generally one or more means of circumventing the security protection, making such security effective primarily against casual users.

At present there is no software security scheme allowing for protection of only one programmer-definable section of the array while allowing for programming of the remainder of the array.

Block-Segmented Secure Memory

This application describes a scheme to allow a device to be programmed by two or more parties with full security protection for each party's code. This invention allows a manufacturer to program basic routines into the device and a developer to further program the device for a particular application, with full security protection for each programmer's code. In an alternate embodiment, an end user or other subsequent programmer could add protected code specific to a particular installation. The security circuit and control disclosed in this application provide each programmer with strong protection against piracy by any third party as well as any of the other programmers.

In the preferred embodiment, security protection is accomplished by segmenting a non-volatile memory array into two or more sections, definable by the first programmer. Once one section is programmed and locked, no programmer or user has read or write access to any protected section, nor can established section boundaries be modified. A read instruction will only be executed by the CPU if it references a memory address in the same memory section as the instruction's address. An instruction to the CPU to read an address in a different section is simply ignored.

This application discloses a number of other features designed to prevent circumvention of the primary security scheme. The processor employs a mechanism to protect the values of the code section boundaries themselves and various novel schemes are employed to protect the secured code while the CPU is in one of its built-in test modes. Through these mechanisms, a developer can install his code on this CPU with a high degree of confidence that it is secure from piracy by his competitors and customers.

An advantage of the disclosed methods and structures is that they allow for programming and reading of one section of memory while completely protecting a secure section from read or program operations

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Operation of Memory Section Protection

Figure 2:
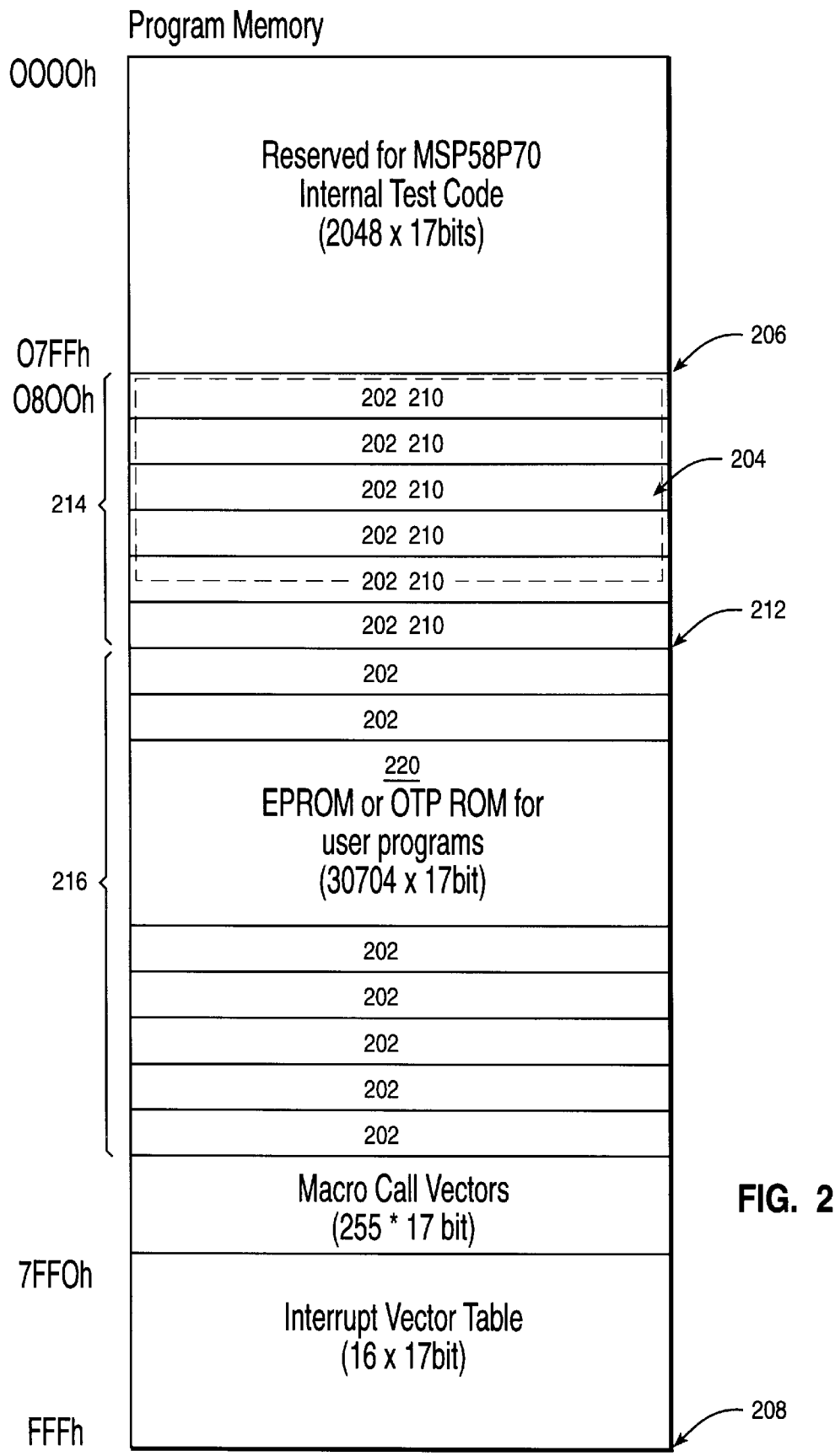
FIG. 2 shows a memory array divided into two sections for security reasons.

Referring to FIG. 2, a non-volatile memory array 220 is divided into two or more blocks 202 by its design. The code 204 programmed by the first programmer occupies one or more blocks 202, beginning at the first memory address 206. After initial programming is complete, the next-to-last address 208 of the array 200 (the protection register) is set to correspond to the number of protected blocks 210, thereby setting the section boundary 212 and dividing the array into a primary security section 214 and secondary security section 216. The contents of the primary security section 214 are rendered non-readable and non-writeable when bit 7 of the protection register (block protect) is enabled (set to zero).

Security of Protection Value

In the preferred embodiment, bits 9–15 of the protection register are written with a value reflecting the number of blocks protected, while bits 0–6 are written with the one's complement (logical inverse) of that value. For example, the one's complement of 1011 1001 is 0100 0110. This inverse value verify scheme is necessitated by the fact that the protection register is located within a part of memory under the control of the second programmer, and can be tampered with even after block protect is enabled. The inverse value verify scheme employed in this invention takes advantage of the fact that the default value of the EPROM bits is one, and that during programming, a bit can be cleared but cannot be returned to one (i.e., only zeros can be written to the EPROM cells). An eight-bit word in EPROM registers 1111 1111 at manufacture. A first programmer could, for example, program it to 1111 0000. That word could not then be programmed to 1111 0101, although it could be programmed to 1010 0000.

If only the protection value itself were used as an index, a subsequent programmer could completely defeat the security scheme by simply clearing the protection value, thereby rolling the section boundary back to zero and placing the entire memory array under his control. The programmer could then copy the entire contents of the array, including the first programmer's code, to one of the processor's output ports.

Conversely, if only the inverse value were used, a subsequent programmer could defeat the security scheme by writing a "Trojan horse" program in the unprotected region and then clearing the protection value, thereby moving the section boundary to the end of memory. The Trojan horse program would then be behind the same section boundary as the original code. The security circuitry would then allow the Trojan horse access to the entire memory array. The program could then copy the entire array to the processor's output port. With the scheme utilized in the preferred embodiment, the second programmer cannot fix bits 0–6 to complement a modified value in bits 9–15. For example, if the original protection value was 101 0011, the proper complement is 010 1100. A second programmer can change the protection value to 000 0000; however, because ones cannot be written to EPROM, he cannot change the complement from 010 1100 to 111 1111. The security circuitry will detect this discrepancy and disable all read and write access to the array.

Memory Protection Circuitry

Once the protection value is programmed and block protect is enabled, the CPU will not execute any table look-up instruction unless the address of the instruction and the address being looked at are in the same section (i.e., are on the same side of the section boundary).

In order to carry out this security check, the device compares both the program counter (the address of the instruction currently being executed) and the data pointer (the memory address currently being acted upon) to the protection value. Both must be either higher or lower than the protection value. If the two addresses are not on the same side of the protection value (section boundary) after block protection is enabled, no table look-up or write instructions will execute.

Figure 1:
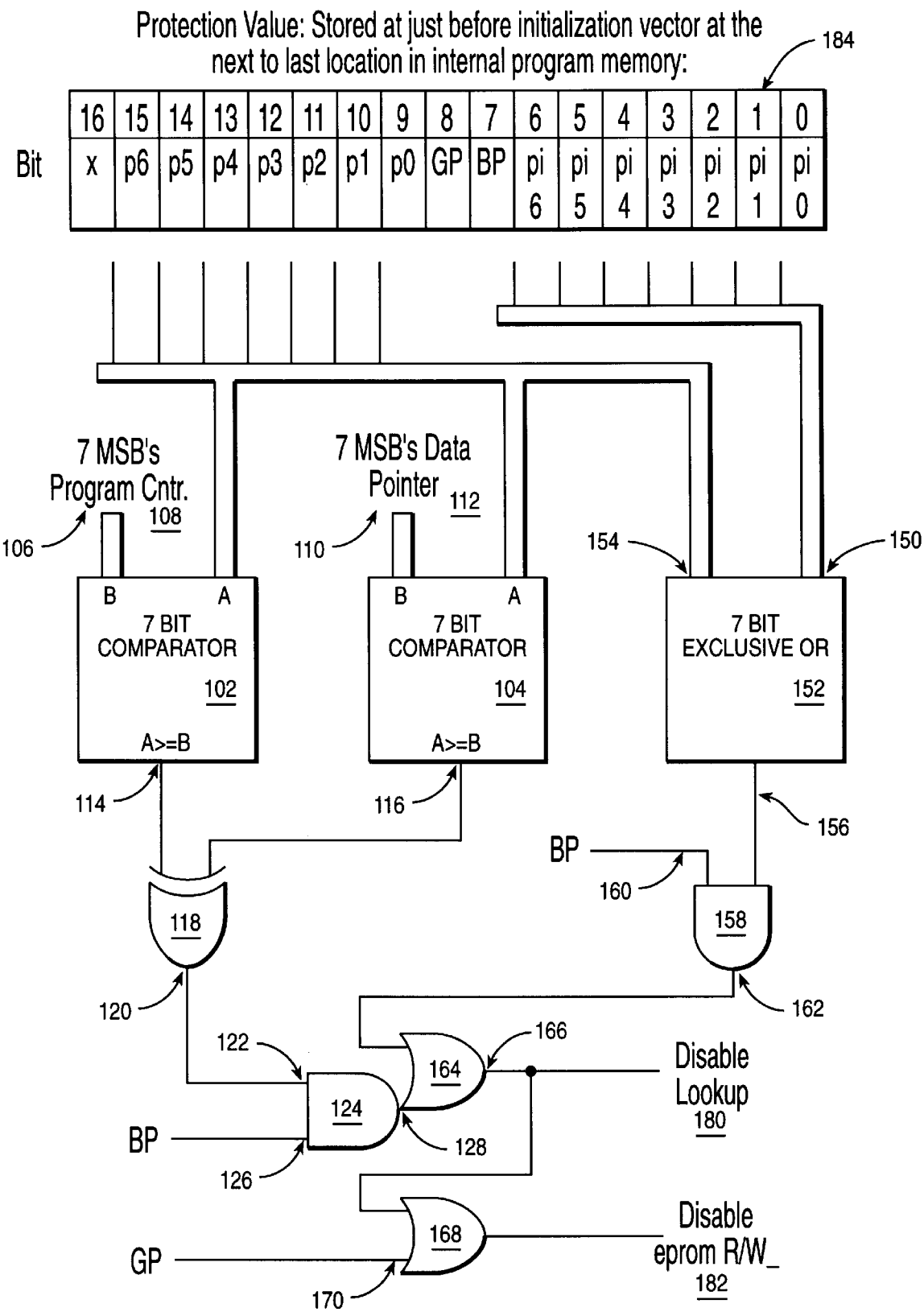
FIG. 1 is a circuit diagram depicting the disclosed security scheme.

The circuitry that performs this security check is depicted in FIG. 1. The contents of bits 9–15 of the protection register 184 are loaded into input B of both the program counter comparator 102 and the data pointer comparator 104. The block 106 of 7 most significant bits of the processor program counter 108 (i.e., the instruction address, to the nearest whole block) is loaded to input A of the program counter comparator 106. The block 110 of 7 most significant bits of the processor data pointer 112 (i.e., the memory address of the instruction operand, to the nearest whole block) is loaded into input B of the data pointer comparator 104. Each comparator outputs a logical "true" if the value of input A is greater than or equal to the value of input B.

The outputs 114 and 116 of the two comparators; 102 and 104 are fed into an exclusive-or (XOR) gate 118. The output 120 of the XOR gate 116 will be true if the outputs 114 and 116 of the comparators 102 and 104 differ (i.e., if the addresses lie in different sections), but otherwise will be false. The output 120 of the XOR gate 118 is fed into one input 122 of an AND gate 124. The other input 126 to the AND gate 124 is supplied by block protect bit 7. The output 128 of the AND gate 124 will be true if block protect is enabled and the addresses of the instruction and the operand (data) are not in the same section. This output 128 is used by the circuit in a manner described below.

The second portion of the block protect circuitry is designed to protect against tampering with the protection value stored in the protection register. The circuit compares the protection value to a check value that is expected to be the one's complement (logical inverse) of the protection value. If the check value is riot the inverse of the protection value when block protect is enabled, the processor will completely disable all look-up instructions.

The circuitry for carrying out this comparison is also depicted in FIG. 1. Bits 0–6 of the protection register are fed into one input 150 of a 7-bit exclusive-OR (XOR) gate 152. Bits 9–15 of the protection register are fed into another input 154 of the same XOR gate 152. The output 156 of this gate 152 will be false if each bit 0–6 is the logical inverse of its corresponding bit within bits 9–15 (i.e., if there has been no tampering). The output 156 will be true if there is a mismatch (i.e., either the protection value or the check value have been tampered with). The output 156 of the XOR gate 152 is fed into one side of an AND gate 158. The other input 160 to the AND gate 158 is supplied by the block protect enable bit 7 of the protection register 100. The output 162 from the AND gate 158 will be true when there is a mismatch in the inverse check value and block protect is enabled.

Output 128 from the sector comparison circuitry and output 162 from the protection value security circuitry are then fed into an OR gate 164. The output 166 from this gate 164 runs to other processor logic 180 and disables all lookup (i.e., read) instructions when it is true. Therefore, if either the sector boundary is breached or the protection value is tampered with when block protect is enabled, the processor will disable all lookup instructions. Furthermore, this output 166 is also fed into a second OR gate 168. The other input 170 reflects the state of global protect bit 8 from the protection register. The output 172 from this OR gate 168 runs to other processor logic 182 and completely disables any read or write operations to the EPROM array when it is true.

Memory Security Protection During Test Mode

A second tier of protection is provided to prevent a programmer from gaining access to protected memory through the use of the processor's test modes, particularly the EMULATION and TRACE test modes. In EMULATION mode, the processor executes instructions and reads data registers, including the memory protection value, from external memory as if they were from internal memory. In the TRACE modes (TRACE1 and TRACE2), the processor executes internal instructions subject to timing and breakpoints controlled by the user.

Allowing free transition between the EMULATION and TRACE modes would enable a programmer to fairly easily circumvent the security circuitry. He could store a different protection value, for example, 000000, in external memory and use EMULATION mode to force the processor to use the new protection value. He could then transition to a TRACE mode to walk through the previously protected programs in internal memory one instruction at a time. This processor blocks that tactic by forcing the programmer to initialize the device before the test operation mode can be switched. Upon initialization, the processor immediately reads the protection value from the next-to-last memory location in the internal EPROM, thereby insuring against any confusion of the security circuitry caused by the use of bogus protection values.

MSP5870 Processor Architecture

Figure 3A:
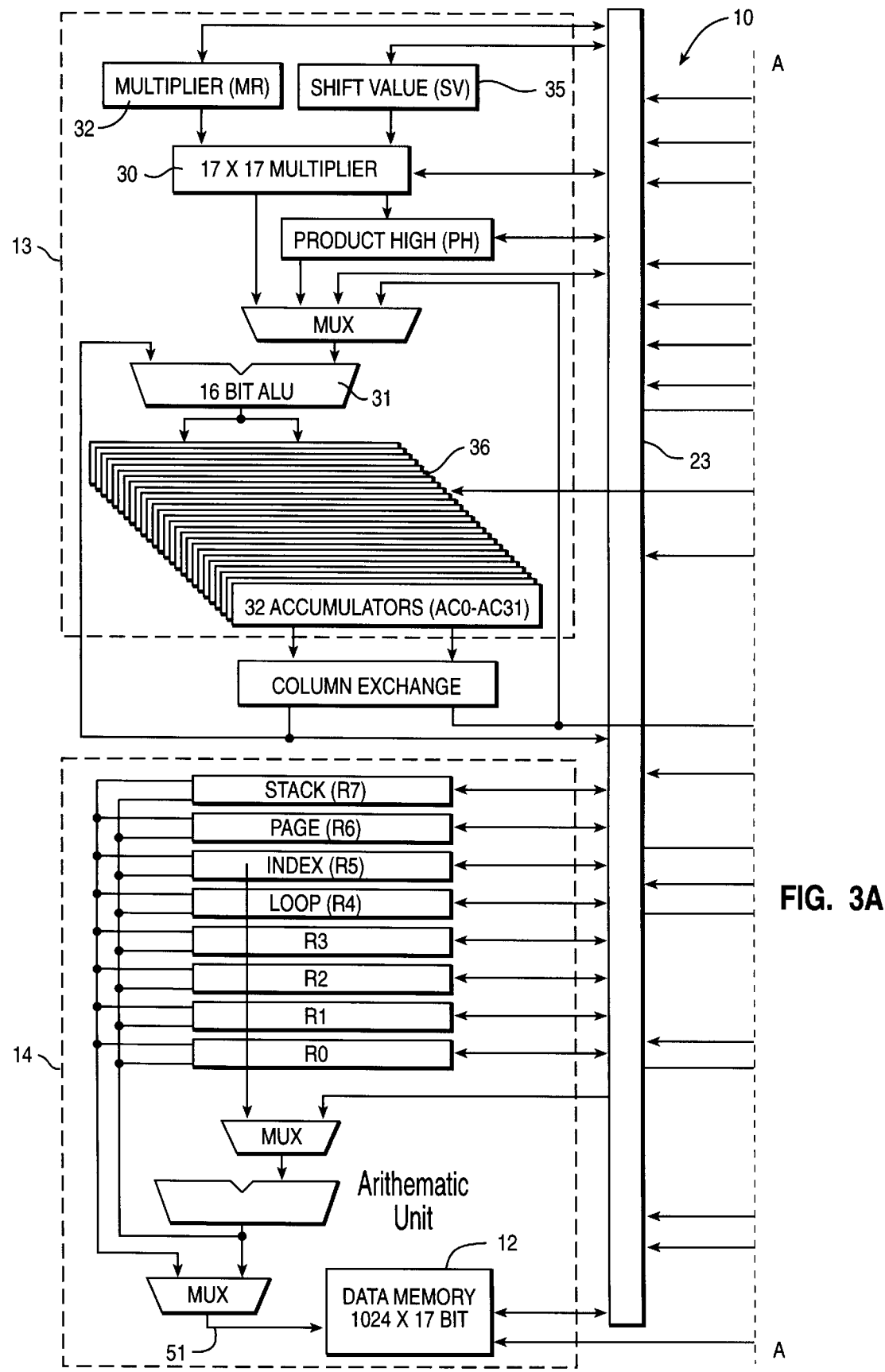
FIG. 3 depicts a block diagram of a mixed-signal processor.
Figure 3B:
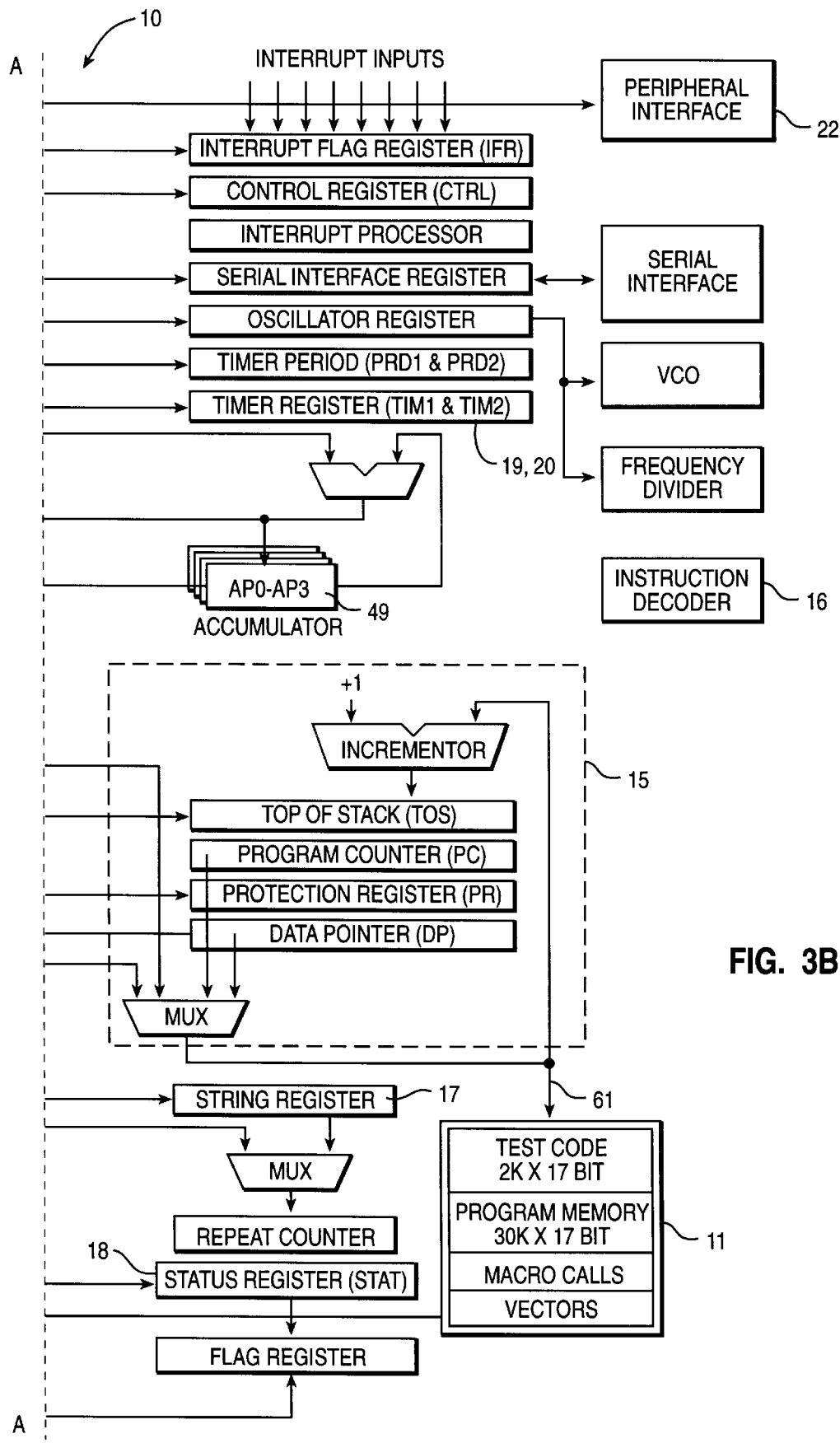

This security scheme was originally incorporated into a low-cost mixed-signal processor designed for customer electronics. A block diagram of the mixed-signal processor is shown in FIGS. 3A–3B. A processor 10 in accordance with the preferred embodiment comprises a number of major sub-blocks, including a program-data memory block 11 and a data-memory block 12. The major sub-blocks comprise a computational-unit (CU) 13, a data-memory-address-unit (DMAU) 14, a program-counter unit (CU) 15, and an instruction decoder 16. Other functions are provided by a repeat or chain-counter register 17, a status register 18, two timers 19 and 20, interrupt logic 21, and a peripheral expansion interface 22.

A 17-bit data bus (DB) 23 provides communication between the functional blocks within processor 10. Most of the registers within processor 10 have read and write access to DB 23. The bus drivers (not shown) are static devices in order to avoid unnecessary power consumption, and in order to provide a maximum logic propagation time. The minimum instruction period of processor 10 is about 100 ns, with a 10 nHz processor clock (not shown) being provided.

Data memory 12 of FIGS. 3A–3B is organized as a plurality of 17-bit parallel words. The number of words varies in accordance with the application to which processor 10 is applied, but die range of 256 to 2048 words is exemplary, with 1152 words being indicated in FIG. 3. Each address 51 that is provided by DMAU 14 causes 17 bits of data to be addressed. These 17 bits will be operated on in a number of different ways, depending upon the instruction being executed. For most instructions this data is interpreted in a 16-bit word format. Two byte instructions, such as LACB and SACB cause processor 10 to read or write data in an 8-bit word format, also called a byte format. This byte format mode causes the processor hardware to read or write either the upper or the lower byte of the addressed 16-bit word, and the fetched byte is right-justified on DB 23.

Consumer Electronics

Figure 4:
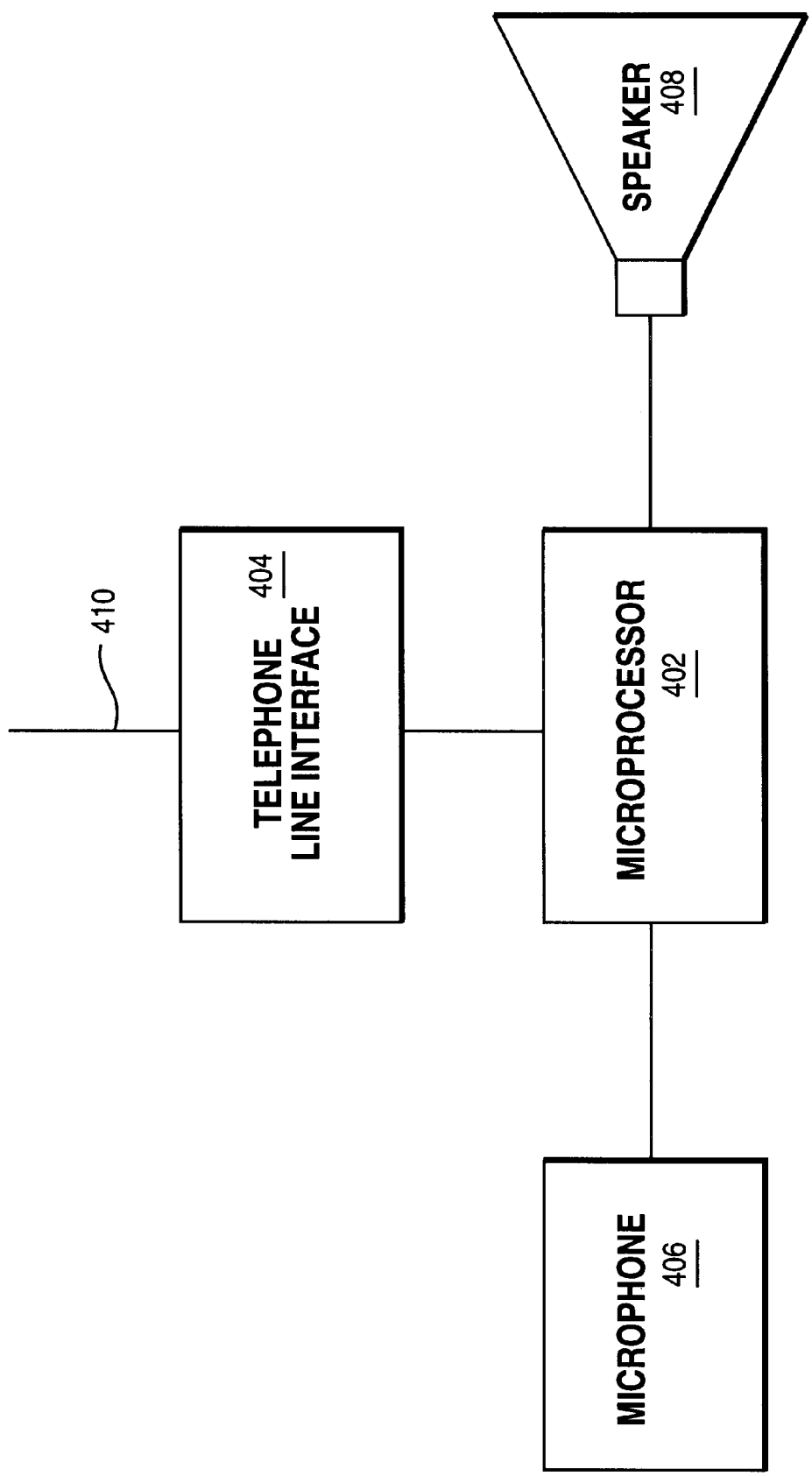
FIG. 4 depicts a telephone answering machine using this memory array.

This memory, and the microprocessor into which it is incorporated, are designed for use in consumer electronics, such as telephone answering machines. A block diagram of an answering machine incorporating this invention is shown in FIG. 4. In this device, the processor 402 is operatively connected to an telephone line interface 404, a microphone 406, and a speaker 408. The microprocessor 402 receives and transmits sound data over the telephone line 410 via the telephone line interface 404. The microprocessor is also able to transmit sound data into the surrounding area via the speaker 408, and receive sound data from the surrounding area via the microphone 406.

Alternative Embodiments

In an alternative embodiment, this scheme could be implemented in a memory array holding both code and data (e.g., von Neumann architecture), so long as the set of instructions blocked by the security circuitry is adjusted. The microprocessor into which this memory is incorporated is designed around Harvard-style architecture, wherein the code and data banks segregated from one another, but there is nothing within the invention that limits it to this architecture.

In another alternative embodiment, a memory array could be segmented into two secured sections and a remaining unsecure section. This could be very useful where it is desirable for two or more secured sections to have read access to the same data, or to leave a section open to store a set of final tuning parameters calculated after the IC is installed in a machine.

Other features and details which are also contemplated for use in conjunction with the preferred embodiments, but which are not necessary for practice of the claimed inventions, are disclosed in the following co-pending applications:

Ser. No. 60/090,670—"Variable Word Length Data Memory"; and

Ser. No. 60/090,589—"Low Cost Multiplier Block with Chain Capability"; and

Ser. No. 60/090,671—"Flexible Accumulator Register File for Use in High Performance Microprocessors".

All of these are commonly owned with the present application, and have effective filing dates which are simultaneous with that of the present application, and are herein incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

Although the preferred embodiment disclosed in this application is incorporated into internal EPROM in a microprocessor, and describes a memory array divided into two sections, nothing in the nature of the invention limits its application to an array divided into only two sections, to internal memory or to any particular type of memory.

The circuitry could be modified to allow for three or more secure sections, so long as the security circuitry was duplicated or multiplexed to accomodate the additional section boundaries. This would be useful where the end user has a need to store parameters in the memory, or where final tuning parameters need to be stored to the memory after installation.

The secure memory could be in a separate IC from the CPU. This would require some additional security or encryption circuitry to prevent read access to the content of the chip through other means.

This security scheme could also be implemented in other forms of non-volatile memory, in arrays where part of the array is read-only memory, or even in volatile memory.

What is claimed is:

1. An integrated circuit comprising:
   program memory;
   a security register for storing a section boundary address corresponding to a boundary between first and second portions of said program memory;
   a programmable processor, coupled to said program memory, for executing instructions stored in the first portion of said program memory, and instructions stored in the second portion of said program memory, the instructions including accesses to the program memory at an address corresponding to the contents of a data pointer;
   a program counter, for storing a program memory address corresponding to an instruction being executed by the programmable processor; and
   security logic, coupled to the programmable processor and the security register, and comprising boundary logic for disabling execution of an instruction responsive to the contents of the data pointer indicating a memory address in one of the portions of the program memory in combination with the program memory address corresponding to an address in another one of the portions of the program memory.

2. The integrated circuit of claim 1, wherein the security register comprises a plurality of bit locations that are bit-programmable from a first state to a second state but not from the second state to the first state;
   and wherein said security logic further comprises:
      complement logic, coupled to the security register, for disabling execution of an instruction responsive to a first group of bits of said security register not corresponding to the complement of a second group of bits of said security register.

3. The integrated circuit of claim 1, wherein said programmable processor is capable of operation in at least two selectable test modes;
   and wherein said programmable processor reads the contents of the security register responsive to changing its mode of operation from one of the test modes to another of the test modes.

4. The integrated circuit of claim 1, wherein the boundary logic disables execution of a plurality of instructions responsive to the contents of the data pointer indicating a memory address in one of the portions of the program memory in combination with the program memory address corresponding to an address in another one of the portions of the program memory, the plurality of instructions comprising a table lookup instruction.

5. The integrated circuit of claim 1, wherein the boundary logic disables execution of a plurality of instructions responsive to the contents of the data pointer indicating a memory address in one of the portions of the program memory in combination with the program memory address corresponding to an address in another one of the portions of the program memory, the plurality of instructions comprising a write to the program memory.

6. A microprocessor, comprising:
   a computational unit for executing program instructions upon data;
   data memory, coupled to the computational unit, for storing data operands;
   program memory coupled to said computational unit for storing instructions executable by the computational unit;
   a security register for storing a section boundary address corresponding to a boundary between first and second portions of said program memory;
   a program counter, for storing a program memory address corresponding to an instruction being executed by the computational logic;
   a data pointer, for storing a memory address corresponding to a memory location to be accessed in execution of an instruction; and
   boundary control logic, coupled to the security register, to the program counter, and to the data pointer, for blocking memory access responsive to the contents of the data pointer indicating a memory address in one of the portions of the program memory in combination with the program memory address corresponding to an address in another one of the portions of the program memory.

7. The microprocessor of claim 6, wherein the security register comprises a plurality of bit locations that are bit-programmable from a first state to a second state but not from the second state to the first state;
   and further comprising:
      complement logic, coupled to the security register, for disabling execution of an instruction responsive to a first group of bits of said security register not corresponding to the complement of a second group of bits of said security register.

8. The microprocessor of claim 6, wherein the microprocessor is capable of operation in at least two selectable test modes;
   and wherein said microprocessor reads the contents of the security register responsive to changing its mode of operation from one of the test modes to another of the test modes.

9. The microprocessor of claim 6, wherein the boundary logic disables execution of a plurality of instructions responsive to the contents of the data pointer indicating a memory address in one of the portions of the program memory in combination with the program memory address corresponding to an address in another one of the portions of the program memory, the plurality of instructions comprising a table lookup instruction.

10. The microprocessor of claim 6, wherein the boundary logic disables execution of a plurality of instructions responsive to the contents of the data pointer indicating a memory address in one of the portions of the program memory in combination with the program memory address corresponding to an address in another one of the portions of the program memory, the plurality of instructions comprising a write to the program memory.

11. The microprocessor of claim 6, wherein the data memory and program memory are arranged in a single memory resource.

12. A telephone answering machine, comprising:

a microprocessor, comprising:

a computational unit for executing program instructions upon data;

data memory, coupled to the computational unit, for storing data operands;

program memory coupled to said computational unit for storing instructions executable by the computational unit;

a security register for storing a section boundary address corresponding to a boundary between first and second portions of said program memory;

a program counter, for storing a program memory address corresponding to an instruction being executed by the computational logic;

a data pointer, for storing a memory address corresponding to a memory location to be accessed in execution of an instruction; and boundary control logic, coupled to the security register, to the program counter, and to the data pointer, for blocking memory access responsive to the contents of the data pointer indicating a memory address in one of the portions of the program memory in combination with the program memory address corresponding to an address in another one of the portions of the program memory;

an interface operatively connected said microprocessor to a telephone line in such a way as to receive and send messages;

a microphone operatively connected to said microprocessor in such a way as to record sound for storage within the answering machine; and a speaker operatively connected to said microprocessor in such a way as to play back sounds stored within the answering machine.

13. The system of claim 12, wherein the security register comprises a plurality of bit locations that are bit-programmable from a first state to a second state but not from the second state to the first state;

and wherein the microprocessor further comprises:

complement logic, coupled to the security register, for disabling execution of an instruction responsive to a first group of bits of said security register not corresponding to the complement of a second group of bits of said security register.

14. The system of claim 12, wherein the microprocessor is capable of operation in at least two selectable test modes;

and wherein said microprocessor reads the contents of the security register responsive to changing its mode of operation from one of the test modes to another of the test modes.

* * * * *